Aug. 27, 1957

C. R. WISCHMEYER 2,804,546

FREQUENCY DISCRIMINATOR

Filed Aug. 12, 1954

INVENTOR.
Carl R. Wischmeyer,
BY
Frank S. Troidl

AGENT.

United States Patent Office 2,804,546
Patented Aug. 27, 1957

2,804,546

FREQUENCY DISCRIMINATOR

Carl R. Wischmeyer, Houston, Tex., assignor, by mesne assignments, to Esso Research and Engineering Company, Elizabeth, N. J., a corporation of Delaware Application August 12, 1954, Serial No. 449,291

3 Claims. (Cl. 250—27)

This invention relates to frequency discriminators. More particularly, this invention relates to frequency discriminators of relatively simple construction and which do not depend upon resonant elements.

Several well known types of discriminator have been known and used in the past. However, the usual discriminator has as a part of its circuit one or more groups of elements which depend upon resonance for the proper operation of the discriminator. For a great many purposes for which a frequency discriminator is utilized the resonant elements have certain disadvantages. This is so particularly in the audio and lower frequency radio spectrum.

It is an object, therefore, of this invention to provide a simple electrical circuit which is not dependent upon resonance for its proper operation.

Briefly described, my new frequency discriminator consists of an electrical circuit which receives an alternating-current input and produces a direct-current output which is negative or positive, according to whether the frequency of the input lies above or below a predetermined "center" frequency. The center frequency is established by proper choice or adjustment of impedance components within the frequency discriminator.

Figure 1:
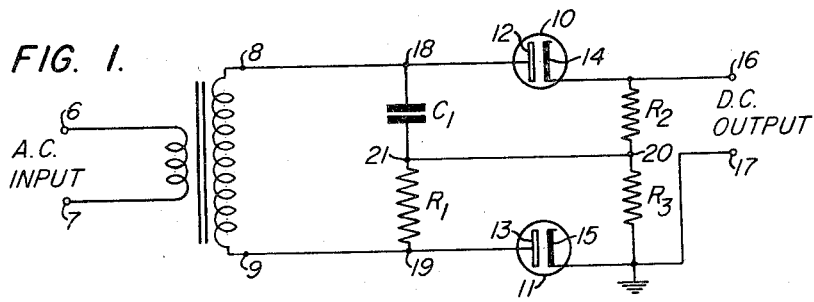
Figure 2:
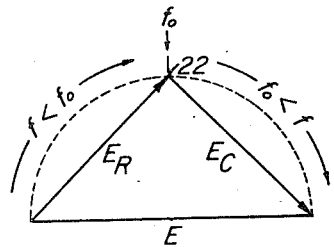
Figure 3:
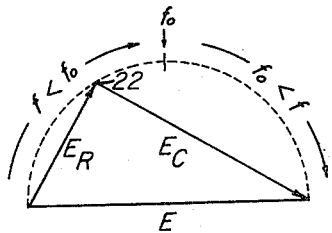
Figure 4:
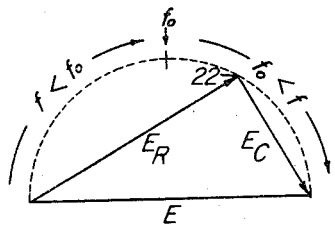

Other objects and advantages of the invention will be best understood from the following description of an exemplification thereof, reference being had to the accompanying drawings, wherein:

Fig. 1 is a schematic circuit diagram of a frequency discriminator according to my invention; and Figs. 2, 3 and 4 are vector diagrams useful in explaining the operation of the circuit.

Referring to Fig. 1 of the drawing, an A. C. input is delivered to the frequency discriminator by means of terminals 6 and 7. A coupling means, which will provide a D. C. return path, such as a transformer, having a primary winding and a secondary winding provides a voltage across terminals 8 and 9 in response to the input alternating voltage. Connected to terminal 8 of the secondary winding of the transformer is a rectifier 10. A rectifier 11 is connected to terminal 9 of the secondary winding. Terminals 8 and 9 are connected to the plates or anodes 12 and 13 of the rectifiers 10 and 11, respectively. Connected to the cathode 14 of rectifier 10 is a load resistance $R_2$. Connected to the cathode 15 of rectifier 11 is a load resistance $R_3$. It can be seen that by this arrangement the voltage developed by rectifier 10 across load resistor $R_2$ is in opposition to the voltage developed by rectifier 11 across load resistor $R_3$. Hence the average potential of terminal 16 with respect to terminal 17 is positive or negative according to whether or not the voltage across $R_2$ is greater or less than the voltage across $R_3$.

In the circuit a phase shifting impedance is provided consisting of only 2 arms, a capacitive arm $C_1$ and a resistance arm $R_1$. The input to the capacitance arm $C_1$ is connected to terminal 8 through terminal 18. The input to resistor $R_1$ is connected to terminal 9 by means of input terminal 19. The output of the phase shifting elements is delivered to terminal 20, which is located between the resistance loads $R_2$ and $R_3$, through output terminal 21. The voltage across capacitor $C_1$ is in quadrature with the voltage across resistor $R_1$ in the phase shifting circuit, the resultant of these two voltages being always equal to the input applied voltage. For proper operation the magnitude of load resistors $R_2$ and $R_3$ must be large as compared with resistor $R_1$ and the reactance of condenser $C_1$.

For purposes of analysis, reference is made to Figs. 2, 3 and 4, which are vector diagram representing the voltage across resistor $R_1$ and the voltage across capacitive reactor $C_1$ with an applied constant voltage E as the frequency of the constant applied voltage is varied from below the center frequency $f_0$ to above the center frequency $f_0$. When my new frequency discriminator is operating at frequency $f_0$, the vectors, as shown in Fig. 2, obtain. As shown in Fig. 2, vector $E_R$, which represents the voltage across resistor $R_1$, and vector $E_c$, which represents the voltage across $C_1$, are in quadrature; and the resultant of the voltages $E_R$ and $E_c$ equals the applied voltage E. As shown in Fig. 2, the voltages $E_R$ and $E_c$ at center frequency $f_0$ are equal. If these voltages are developed across a stiff circuit which is loaded insignificantly when the diode and resistance load combinations are added, the D. C. voltage drop across resistance load $R_2$ will depend upon the voltage across capacitive reactor $C_1$ and the D. C. drop across resistance load $R_3$ will depend upon the voltage across the resistor $R_1$. Since the voltages developed across the loads $R_2$ and $R_3$ are in opposition, the direct-current output voltage will amount to zero at the center frequency $f_0$.

The vectors shown in Fig. 2 represent the voltages across resistor $R_1$ and across capacitor $C_1$ only at center frequency $f_0$. The ratio of the voltages across the resistor $R_1$ and condenser $C_1$ will vary, however, as the frequency of the input applied voltage varies. The locus of the juncture point 22 of the vectors $E_R$ and $E_c$ is a semicircle. The value of vector $E_R$ increases as the frequency of the applied voltage E increases, with $E_c$ being in quadrature with $E_R$ and the resultant of $E_R$ and $E_c$ being always equal to the applied voltage vector E. $E_c$ decreases in value and $E_R$ increases in value as the frequency of the applied voltage E increases.

Fig. 3 represents the voltage vectors of $E_R$ and $E_c$ when the applied voltage has a frequency less than center frequency $f_0$. As can be seen, the vector $E_R$ is smaller in magnitude than the vector $E_c$. Therefore, the voltage across $R_2$ is greater than the voltage across $R_3$ and the D. C. voltage across terminals 16 and 17 is positive with respect to ground.

In Fig. 4, the vectors $E_R$ and $E_c$ represent the voltages across resistor $R_1$ and capacitor $C_1$ with an applied input voltage having a frequency greater than center frequency $f_0$. In this connection, the voltage developed across $R_3$ is greater than that developed across $R_2$ and the direct voltage across terminals 16 and 17 is negative with respect to ground.

It is to be noted that my new frequency discriminator does not rely upon any resonant elements within the circuit and that it is simple in construction, requiring only two arms in the phase shifting circuit.

Although the phase shifting circuit has been described as including a capacitor $C_1$, this has been done only by way of example. If desired, capacitor $C_1$ may be replaced with an inductor having a corresponding reactance, and the discriminator will function in a similar manner. The basic idea lies in the use of two series impedance elements or combinations thereof connected between points 18 and 21 and between 21 and 19 of the circuit of Fig. 1.

While I have shown and discussed a certain embodiment of the invention, other modifications will be apparent and at once suggest themselves to those skilled in the art, without departing from the spirit and scope of my invention.

I claim:

1. A frequency discriminator circuit comprising: an input impedance having a pair of end terminals between which an alternating input voltage appears; a pair of rectifiers each having an input electrode and an output electrode; means coupling the input electrode of each rectifier to a corresponding one of said terminals; a pair of output impedances coupled in series between the output electrodes of the two rectifiers; a frequency responsive phase shifting network connected between said terminals consisting of only one resistor and a reactor connected in series, said reactor having a quadrature characteristic, with respect to said resistor, and a connection between the junction of said resistor and said reactor and the junction of said pair of output impedances.

2. A frequency discriminator circuit comprising: an input impedance having a pair of end terminals between which an alternating input voltage appears; a pair of rectifiers each having an input electrode and an output electrode; means coupling the input electrode of each rectifier to a corresponding one of said terminals; a pair of output impedances coupled in series between the output electrodes of the two rectifiers; a phase shifting network connected between said terminals consisting of only one resistor and a reactor connected in series, said reactor having a quadrature characteristic with respect to said resistor, the ohmic reactance of said reactor at a predetermined frequency being equal to the ohmic resistance of said resistor; and a connection between the junction of said resistor and said reactor and the junction of said pair of output impedances.

3. A circuit in accordance with claim 2, wherein the reactor is a capacitor.

References Cited in the file of this patent

UNITED STATES PATENTS

| 2,190,319 | Koch | Feb. 13, 1940 |
| 2,654,841 | Dutton | Oct. 6, 1953 |